Oct. 17, 1961 H. P. RAABE 3,005,059

TONE ARM MECHANISM

Filed Dec. 29, 1958 3 Sheets-Sheet 1

INVENTOR.
HERBERT P. RAABE
BY
Stuart R. Peterson
ATTORNEY

Oct. 17, 1961 H. P. RAABE 3,005,059

TONE ARM MECHANISM

Filed Dec. 29, 1958 3 Sheets-Sheet 2

INVENTOR.
HERBERT P. RAABE
BY
Stuart R. Peterson
ATTORNEY

Oct. 17, 1961  H. P. RAABE  3,005,059
TONE ARM MECHANISM
Filed Dec. 29, 1958  3 Sheets-Sheet 3
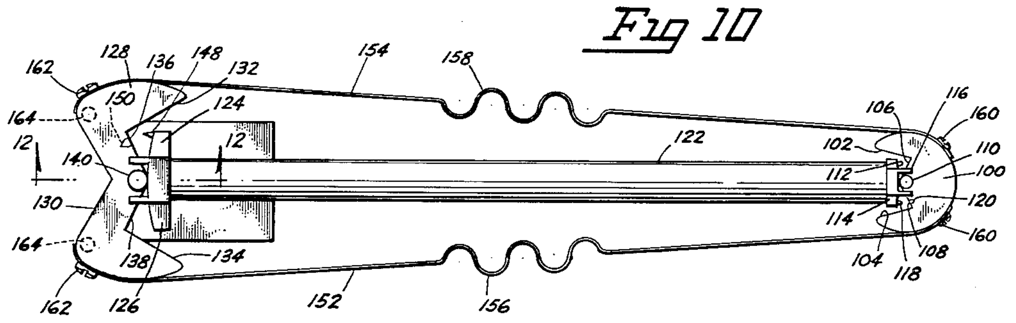
Fig 10
Fig 11
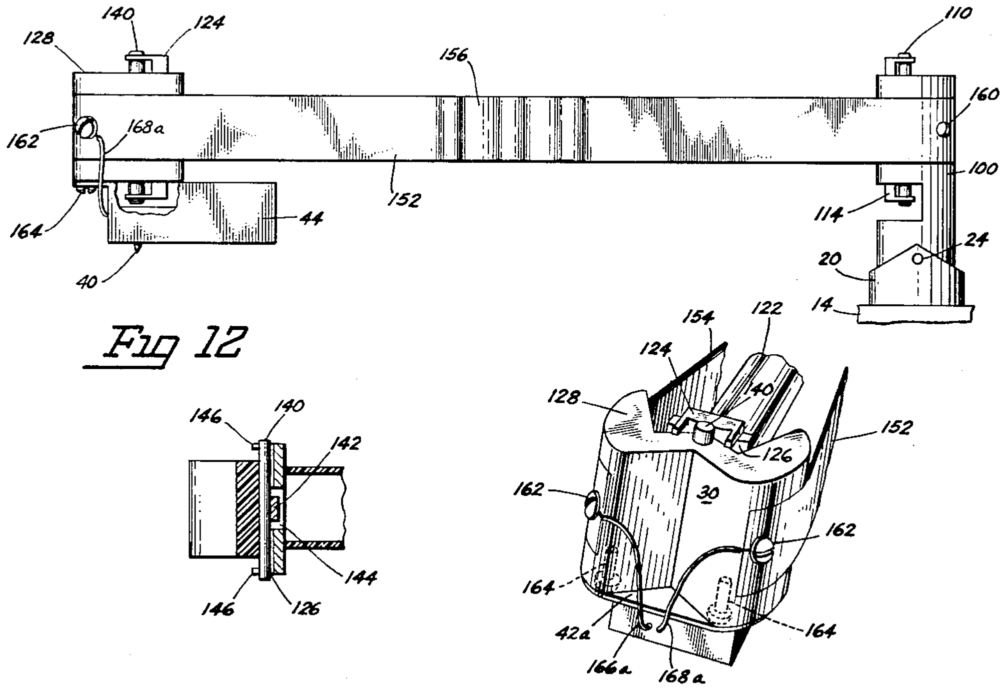
Fig 11, Fig 12, Fig 13
INVENTOR.
HERBERT P. RAABE
BY
Stuart R. Peterson
ATTORNEY United States Patent Office 3,005,059 Patented Oct. 17, 1961

3,005,059
TONE ARM MECHANISM
Herbert P. Raabe, St. Paul, Minn.
Filed Dec. 29, 1958, Ser. No. 783,554
18 Claims. (Cl. 179—100.4)

This invention relates generally to phonographs, and pertains more particularly to an improved tone arm for minimizing tracking distortion in a disc-type record system.

It is generally appreciated that tracking distortion develops if the transducer or pick-up cartridge holding the stylus is not positioned tangentially to the unmodulated groove throughout the entire play-back period of a disc-type record. The deviation of the cartridge position from the groove tangent is called the tracking error.

The most common tone arm design consists of an arm pivotally mounted at one end for swinging movement in a horizontal plane, the arm rigidly supporting the cartridge at its free end. Although this design does not lead to any set of specifications tending to eliminate the tracking error, nonetheless by lengthening the arm the tracking error is proportionately decreased. Furthermore, for a particular tone arm length, the tracking error can be minimized by mounting the cartridge at an angle with respect to the radius of the tone arm, and at the same time disposing the tone arm pivot in such a way that the cartridge stylus overhangs the record center by a certain distance.

However, space limitations have in large measure dictated the need for short tone arms, and the increased desire for smaller tracking errors has led to special, more complicated arrangements. One type of design realizes an infinite tone arm length, this design consisting of a straight rail and a carriage. Inasmuch as the pick-up cartridge is mounted on the carriage, the stylus can travel along a radius of the record. An example of this mechanism is depicted in Patent No. 2,532,293 issued to E. R. De Weese on December 5, 1950. This same patent, incidentally, presents a succinct analysis of the herein alluded to tracking error. Although apparatus of this inproved character eliminates the tracking error, other disadvantages result. For instance, record changing is not as simple as with an ordinary tone arm; more friction must be overcome in order to move the cartridge to the record center, thereby causing increased wear of the record and stylus; and, also, the design has proved quite expensive to manufacture.

Complete elimination of the tracking error is likewise possible by a design principle described in Patent No. 2,516,565 issued to G. E. Guy on July 25, 1950. While this patent refers to several arrangements in which angular movement is imparted to the cartridge and its stylus, the various designs require the use of bearings which produce friction that must of necessity be overcome by the record groove. This means additional vertical stylus pressure and higher wear on the record.

Accordingly, the present invention has for a primary object the elimination of the tracking error without the attendant disadvantages of the referred to prior art devices. More particularly, the invention has for a specific aim the removal of the tracking error in such a way that lateral forces due to friction in bearings are for all intents and purposes obviated. In this regard, it is within the contemplation of the invention to employ a tone arm comprised of several members having cylindrical surfaces that freely roll upon each other.

Another object of the invention is to employ a cartridge capable of being angularly rotated in the realization of distortionless operation, as above-stated, but at the same time permitting removal of all stiffness stemming from the use of the usual hook-up wire leading from the cartridge to the amplifier.

Still further, an object of the invention is to provide a tone arm that may be constructed of light weight parts that are inexpensive to fabricate.

Yet another object is the provision of means whereby the proper initial angularity of the cartridge with respect to the longitudinal axis of the tone arm, and hence the tangential relationship of the stylus with the record groove, can be regained, if lost through rough handling of the tone arm or lost in some other manner.

Other objects and advantages of the invention will hereinafter appear, and for purposes of illustration, but not of limitation, two embodiments are shown on the accompanying drawings, in which:

FIGURE 10 is a plan view of a second tone arm embodiment;

FIGURE 11 is a side elevational view corresponding to FIGURE 10;

FIGURE 12 is a sectional view taken in the direction of line 12—12 of FIGURE 10, and FIGURE 13 is a perspective view of the bobbin and face plate of FIGURE 10.

Figures 1, 2, 3, 4:
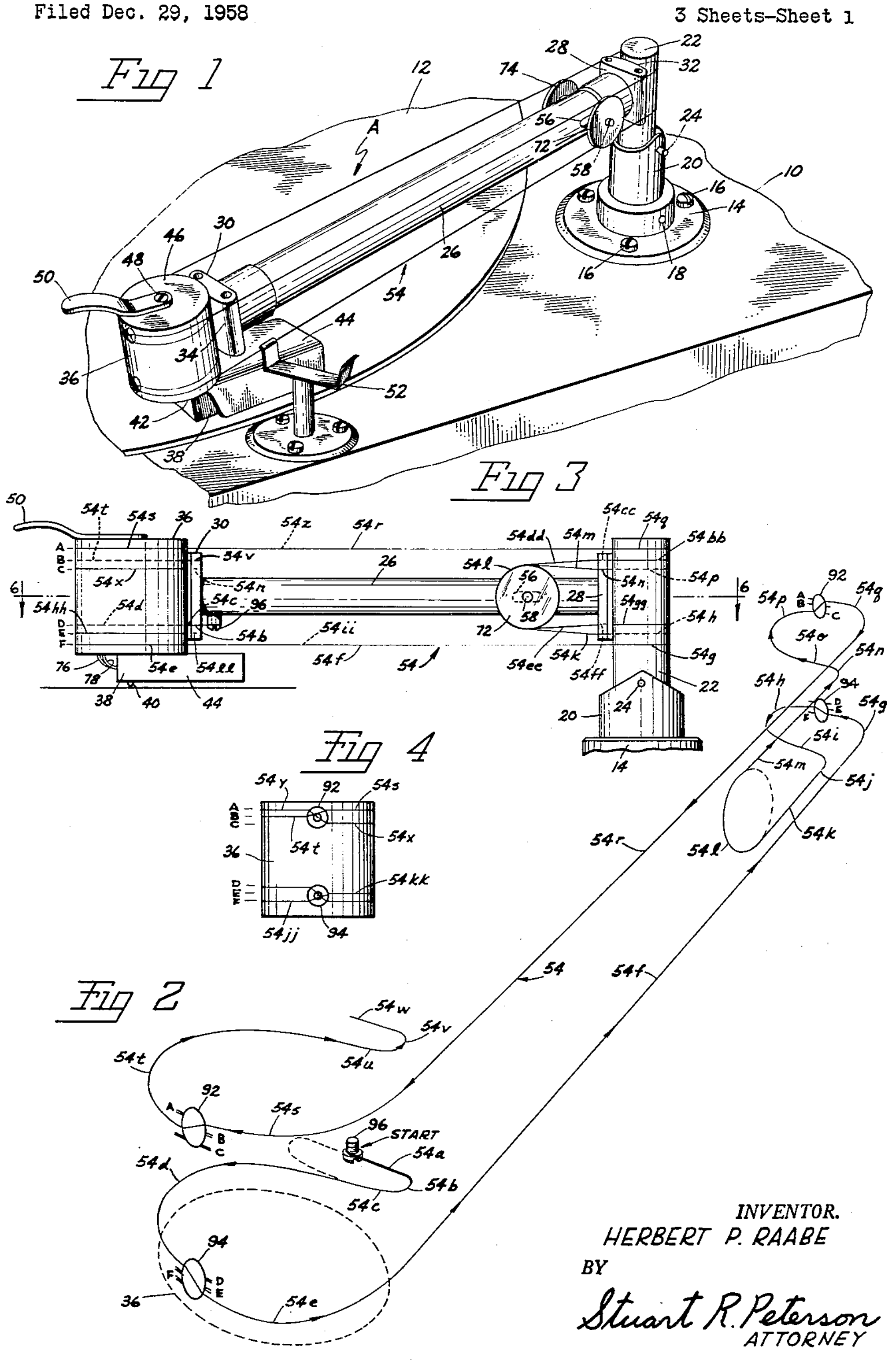
FIGURE 1 is a perspective view exemplifying one embodiment that my invention may assume.
FIGURE 2 is a diagrammatic or lay-out view of one-half of the motion transmitting wire employed in FIGURE 1.
FIGURE 3 is a side elevational view of the tone arm of FIGURE 1.
FIGURE 4 is an end view taken from the left of FIGURE 3.

Referring now in detail to the tone arm A depicted in FIGURES 1–9, FIGURE 1 depicts a portion of a phonograph chassis 10 having a turntable upon which has been placed a conventional disc-type record 12. The tone arm A includes a flanged collar 14 fixed to the chassis 10, as by a plurality of screws 16. By means of a set screw 18 a tubular support 20 is anchored to the collar 14 in an upright manner.

Figure 7:
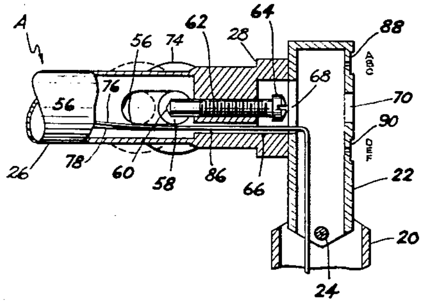
FIGURE 7 is a fragmentary sectional view taken in the direction of line 7—7 of FIGURE 6.
Figure 9:
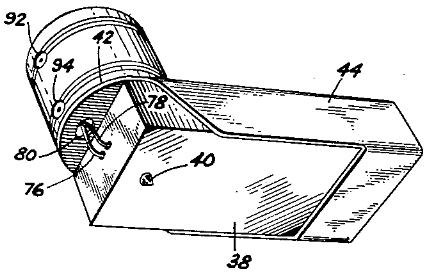
FIGURE 9 is a bottom perspective view of the bobbin, together with the pick-up cartridge attached thereto.

The support 20 serves as a retainer for a cylindrical post 22 which can pivot only about a transverse axis provided by a pin 24 extending through both the support 20 and the post 22, there being sufficient clearance between these two elements to allow a desired degree of up and down pivoting (see FIGURE 7). No rotation about a vertical axis can occur, though, owing to said pin 24.

A reach arm 26 in the form of a hollow tube has an integral face plate 28, 30 at each end. It is important to understand that the oppositely directed surfaces 32, 34 of these face plates constitute segments of a circle. In other words the surfaces 32 and 34 have the same radius and common center of curvature.

Figures 5, 6, 8:
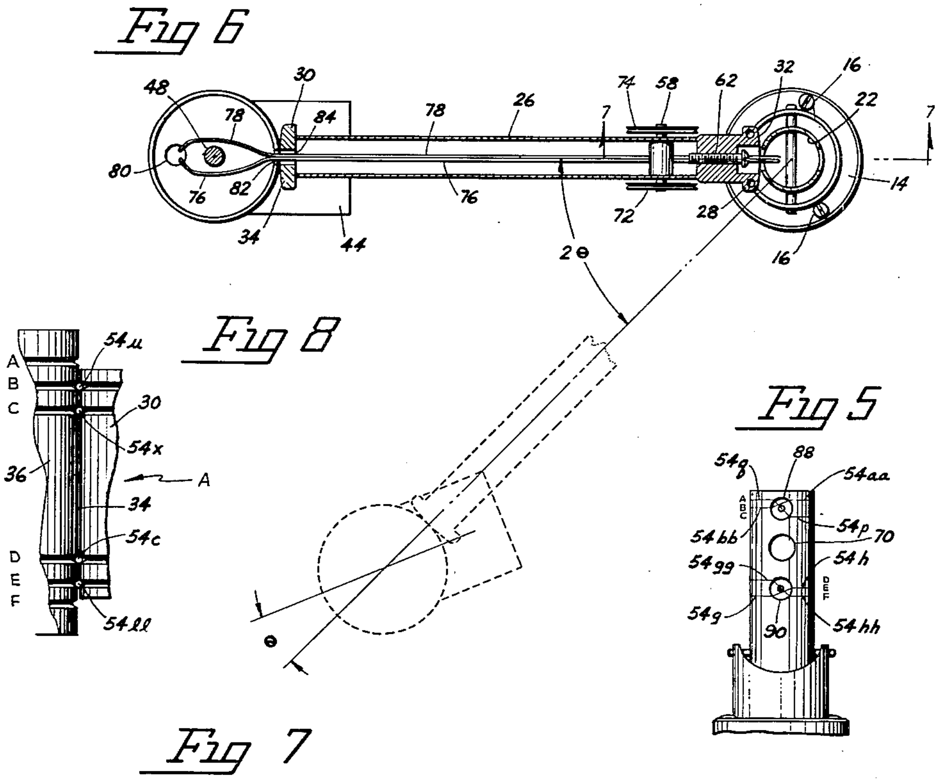
FIGURE 5 is an end view taken from the right in FIGURE 3.
FIGURE 6 is a longitudinal sectional in the direction of line 6—6 of FIGURE 3, the added phantom view aiding in an understanding of the angular relationship of the pick-up cartridge that is maintained during a given sweep of the tone arm.
FIGURE 8 is an enlarged fragmentary view in elevation of the bobbin and its cooperable face plate, the view illustrating the wire-receiving grooves formed in these elements.

Whereas the face plate 28 is associated with the cylindrical post 22, the other face plate 30 is associated with a cylindrical bobbin 36. This bobbin 36 has twice the diameter of the post 22. It may be explained at this time that due to this geometrical relationship of radii, when the tone arm A is swung through an angle equal to $2\theta$, the bobbin 36 will rotate through an angle equal to $\theta$, as illustrated in FIGURE 6.

The bobbin 36 carries for rotation therewith a pick-up cartridge 38 having a needle or stylus 40. Although the bobbin 36 is most desirably a hollow shell, a bottom end plate 42 may be provided having a cartridge accommodating housing 44 for holding said cartridge. An upper end plate 46 is also provided and by reason of a bolt 48 passing through a finger 50 for manually lifting the tone arm A, the plate 46 and the plate 42 the cartridge 38 is fixedly oriented with respect to the bobbin 36. The housing 44 is engageable with an arm rest 52 mounted on the chassis 10 so as to support the tone arm A in an elevated position when not in use.

Through the agency of a belt in the form of a motion transmitting wire 54, the tone arm A is held in an assembled or operative condition. Before describing the path of the wire 54, it will be well to refer to a take-up mechanism by which the wire may be maintained taut. As already mentioned, the reach arm 26 is of tubular construction. Having its ends extending outwardly through a pair of elongated slots 56 formed in the tube 26 is a transverse pin 58 having an enlarged central portion provided with a radial recess 60. As can be seen from FIGURE 7, the face plate 28 is provided with a threaded aperture for the accommodation of an adjusting screw 62, the screw projecting into said recess 60 so as to be engageable with the bottom thereof and having a slotted head 64 by which the screw can be advanced or retracted. The face plate 28 is counterbored at 66 to make room for said head 64. Access to the head 64 from the right end of the tone arm A is provided by reason of a pair of aligned apertures 68, 70 found in the post 22. Journaled on the projecting ends of the pin 58 is a pair of rotatable pulleys 72, 74 about which sections of the wire 54 are entrained.

It might also be explained at this time that the tubular reach arm 26 can serve as a conduit for the electrical conductors 76, 78 leading from the cartridge 38 to the amplifier (not shown) located under the chassis 10. Accordingly, the bottom plate 42 has an opening 80 through which the conductors 76, 78 enter into the confines of the bobbin 36. An aperture 82 (FIGURE 6) intermediate the upper and lower ends of the bobbin 36 permit the conductors 76, 78 to pass through its cylindrical wall into the tube 26 via a passage 84 through the face plate 30. Similarly, a passage 86 in the fact plate 28 allows the conductors 76, 78 to pass through the counterbore 66 and the opening 68 into the post 22 and thence downwardly the flanged collar 14 to the amplifier under the chassis 10.

Before describing the rather tortuous course taken by the wire 54, it will be well to explain that the post 22 and the bobbin 36 have six unnumbered circumferential grooves inscribed thereon at elevations A, B, C, D, E and F, whereas the segmental surfaces 32 and 34 of the face plates 28 and 30 are provided with four unnumbered groves extending thereacross at elevations B, C, D and E. From FIGURES 4 and 5, it can be observed that recessed changeover flats are formed where the wire 54 can change from one elevation to another. The two changeover flats on the post 22 have been indicated by the reference numerals 88, 90 and the ones for the bobbin 36 by the reference numerals 92, 94.

From FIGURES 2 and 3 it can be seen that the opposite ends of the wire are fixedly anchored by a screw 96. Consequently, the screw 96 serves as a good starting point in describing the path taken by the wire 54. To enable the reader to trace this path, various letter suffixes will be employed. Thus, a first section **54*a* appears in FIGURE 2. This section 54*a* comes directly toward the reader in FIGURE 3 at elevation D, extending along the reverse side of the face plate 30. Upon reaching the edge of the face plate it bends about said edge, this section having been denoted by the numeral 54*b*. Next, a section 54*c* extends part way across the curved surface 34 into the groove on the bobbin 36. In other words, the section 54*c* passes between the bobbin 36 and the face plate 30. The wire then emerges on the far side of the bobbin 36 and embraces this bobbin as section 54*d* until it reaches flat 94. At flat 94 the wire changes from the circumferential groove at elevation D to the lowest groove at elevation F. From flat 94 the wire continues as section 54*e*, leaving the bobbin tangentially as section 54*f***.

Section **54*f* runs all the way to the post 22 and engages the lowest circumferential groove at elevation F on the post, then becoming section 54*g*. At flat 90, though, the wire changes to the next higher groove at elevation E and continues around this groove on the far side thereof as section 54*h*. The wire then enters between the face plate 28 and the post 22, running along the curved surface of this plate as section 54*i*. When it reaches the edge of the face plate 28 nearest the viewer in FIGURE 3, it becomes section 54*j* and is then deflected as section 54*k***.

The section **54*k* proceeds to the underside of the stretching pulley 72. A section 54*l* encircles one-half the pulley 72 and leaves the upperside of this pulley as section 54*m*. The pulley 72** is in this way instrumental in changing the elevation of the wire from elevation E to elevation C.

That portion of the wire bending about the edge of the face plate 28 nearest the viewer in FIGURE 3 has been termed section **54*n*. The next section 54*o* extends across the curved surface 32, then following the groove at elevation C on the far side of the post 22 as section 54*p*. At flat 88** there is a change from elevation C to elevation A.

After making the change from elevation C to elevation A, a section **54*q* follows the uppermost groove and leaves this groove as section 54*r* in a direction headed back toward the bobbin 36. Upon reaching the upper groove at elevation A on the bobbin 36 the wire extends thereabout to the flat 92, being called section 54*s***.

At flat 92 the wire drops to elevation B, then proceeding as section **54*t*. It then continues to embrace the bobbin 36, and passes between the face plate 30 and said bobbin, emerging as section 54*u*. When the wire reaches the edge of the face plate 30 closest to the reader in FIGURE 3 it bends thereabout as section 54*v*, then extending across the reverse side of said plate as section 54*w*. Up to here one-half of wire 54** has been described; the second half traverses a similar path as the first half except that the direction and side are reversed.

While sufficient description has been presented to understand how the second half of the wire 54 proceeds, it might be helpful to refer to FIGURE 3 in rather general terms regarding this latter half. To add the second half to FIGURE 2 would only confuse the situation, though. Accordingly, it can be explained that in extending across the reverse side of the face plate 30, the wire drops to elevation C, bends around the far edge of the plate 30, then comes along the curved surface 34 toward the reader as viewed in FIGURE 3. At elevation C it engages the circumferential groove as section **54*x*, but rises to elevation A at flat 92 where it continues as section 54*y* (FIGURE 4). As section 54*z*, the wire advances on the far side, i.e. in back of section 54*r***.

Upon reaching post 22 the wire engages the uppermost groove at elevation A and embraces a portion of this groove as section **54*aa* (FIGURE 5). When section 54*aa* reaches flat 88, however, the wire changes to elevation B and proceeds as section 54*bb* about the side of the post 22 nearer the viewer in FIGURE 3. The wire then passes between the post 22 and the face plate 28 directly away from the viewer in FIGURE 3 and bends around the distant edge of the face plate 28, this section having been designated as 54*cc*. From here a section 54*dd* leads to the upper side of the pulley 74**, the wire encircling one-half of the pulley and then extending back as section 54*ee* to the far edge of the plate 28 where it bends as section 54*ff* about this edge. The wire then comes directly toward the viewer in FIGURE 3 at elevation D between the plate 28 and the post 22. Then it engages the post groove at elevation D, this section being referred to as section 54*gg*. At flat 90 the wire drops to elevation F and continues to encircle the post at this elevation as section 54*hh* until it leaves same as section 54*ii* which is on the far side of previously mentioned section 54*f*. Upon engaging the far side of the groove at elevation F located on the distant side of bobbin 36, the wire becomes section 54*jj* (FIGURE 4). However, at flat 94 the wire rises to elevation E, then embracing the bobbin at this elevation as section 54*kk*. The wire progresses between the face plate 30 and the bobbin 36, and at the far edge of the plate 30 it bends about this edge as section 54*ll*, then extending across the reverse side of said plate to the screw 96 at which point the wire is anchored. This completes the wire layout, both ends thereof being fixedly secured by said screw 96.

Up to this point nothing has been said concerning the relationship of the diameter of the wire 54 with respect to the depth of grooves at the various elevations A, B, C, D, E and F. Preferably the grooves are V-shaped and the depth thereof is somewhat less than 1.4 times the radius of the wire. Such a relationship keeps the bobbin 36 slightly separated from the face plate 30, as pictured in FIGURE 8. Similarly, the face plate 28 is spaced slightly from the post 22.

Having presented the foregoing description, the operation of my tone arm is believed easily understood. With the tone arm assembled, that is, with the wire 54 encircling the various parts as outlined above, the user will then orient the cartridge 38 so that it is tangential to the playing groove of the record 12 as illustrated in phantom outline in FIGURE 6, or he may choose to swivel the cartridge into axial alignment with the longitudinal axis of the reach arm 26 when the tone arm is directly over the turntable spindle, this being the sectioned solid line position appearing in this particular figure. The screw 64 should then be advanced with a small screw driver inserted through the openings 70 and 68 until the wire 54 becomes taut. The tone arm A is then ready for use.

With the stylus 40 engaged with the outermost end of the helical record groove, the cartridge 38 will be automatically rotated during the playing period owing to its direct mechanical connection to the bobbin 36. Because of the previously mentioned relationship between the radius of the bobbin 36 and the post 22, the angle through which the cartridge 38 turns will always be one-half of that through which the reach arm 26 rotates, and the stylus 40 will consequently be tangent to the record groove at all times.

Directing attention now to embodiment B set forth in FIGURES 10–13, it may be explained that the operating principles are the same, although the physical appearance of this modification is appreciably different from what has hereinbefore been described.

As can be seen from FIGURE 11 the flanged collar 14 and the tubular support are again used. Here, though, the post corresponding to the post 22 has been structurally changed, especially as viewed from the top as in FIGURE 10. The present post, denoted by the numeral 100, is preferably of electrical insulating material, a plastic such as nylon, for instance, although it could be metal. As can be discerned from FIGURE 10, the post, although generally cylindrical, is notched so as to provide diverging walls 102, 104 and converging walls 106, 108. The latter walls are grooved at their intersection for the concentric reception of a vertical metallic pin 110 which provides the requisite hardening for the bearing surface, although the post material itself might in some instances furnish such surface if sufficiently hard. The post 100 and the pin 110 constitute a single unit and the manner in which these two parts are held in an assembled relation is better reserved for later discussion.

The pin 110 bears directly against a curved metallic surface 112 of a face plate 114, the face plate itself being of insulating material as is the post 100. The face plate 114 may be formed with projecting fingers or prongs 116 at its upper and lower ends, these prongs helping in preventing unwanted disengagement. To enable perfect realignment to be effected whenever needed, a conical pin 118 projects from the curved surface 112, being engageable in a complemental recess or cavity 120 extending inwardly from the wall 108 of the post 100.

A tubular reach arm 122 supports the face plate 114 in a manner corresponding to the way in which the face plate 28 is supported on the reach arm 26. A second face plate 124 is carried on the opposite end of the reach arm 118, having a curved metallic bearing surface 126. As with the previous embodiment, the surfaces 112 and 126 constitute segments of the same circle.

Corresponding in function to the previously alluded to bobbin 36 is a bobbin 128, also of insulating material. In effect the bobbin 128 is cylindrical, but to make it as light weight as possible, a wedge-shaped section thereof has been removed at 130. Further, the bobbin 128 is notched so as to provide diverging walls 132, 134 and converging walls 136, 138.

Like the post 100, the bobbin 128 supports a concentric metallic pin 140 which bears directly against the curved surface 126. FIGURE 12 depicts the manner in which the pin 140 is retained in place. From this figure it can be observed that in fabricating the bobbin 128, it is cut so as to leave a loop 142 of material which snugly embraces the pin 140. A recess 144 in the metal 126 and plate 124 accommodates this loop. As previously indicated, the pin 110 is held to the post 100 in the same manner. The point to be stressed, though, is that the pin 140 is twice the diameter of pin 110, thereby providing the same angled relationship described in conjunction with FIGURE 6.

Through the agency of fingers or prongs 146 at the top and bottom of the face plate 124, disassembly is prevented, as with the earlier mentioned prongs 116 on the face plate 114. Also, to permit facile reallignment, a conical pin 148 projects from the curved surface and is engageable in a complemental recess 150 in the wall 136 of the bobbin 128.

In lieu of the wire belt 54 of embodiment A, the present embodiment B utilizes a belt in the form of a pair of highly elastic metal bands 152 and 154, each provided with an undulated or corrugated section 156 and 158, respectively. The bands 152, 154 are anchored at one end to the post 100 by a pair of screws 160 and at the other end to the bobbin 128 by a pair of screws 162.

To simplify the description we will assume that the same type of cartridge 38 is used in the present situation. A plate 42*a* may be attached to the underside of the bobbin 128 in any desired manner, a pair of screws 164 having been used in the exemplified instance. Thus the cartridge 38 is received and held fast with respect to the bobbin 128 by the housing 44 integral with said plate 42. In this way the cartridge will be rotated in the same fashion as in the earlier-described embodiment.

While in the preceding embodiment A, conductors 76, 78 of sufficient length were employed so as to extend from the cartridge 38 all the way back to the amplifier, in this embodiment B it is contemplated that the metallic bands 152, 154 function in this capacity. Accordingly, only a pair of relatively short conductors 166*a*, 168*a* are utilized, these leading from the cartridge to the pair of anchoring screws 162 on the bobbin 128. Additional conductors (not shown) will then extend from the screws 160 on the post 100 to the amplifier. By so doing, the band 152 is in one leg of the pick-up circuit and the band 154 in the other leg. It will be immediately perceived that this arrangement obviates any resistance to the turning of the bobbin 128 due to the stiffness of the conductors, for the conductors *166a*, *168a* connect only parts that are directly connected to each other and which parts, of course, move in unison.

Although the operation of embodiment B is the same as with embodiment A, it will be observed that the undulations at 156 and 158 avoid the need for any take-up mechanism. Also, it will be appreciated that during each record changing operation the tone arm B will be swung out to its rest position. As it revolves around the post 100, the bobbin 128 turns in a clockwise direction, as viewed in FIGURE 10, thereby driving the pins 118 and 148 into their respective recesses 120 and 150 so as to realign automatically the reach arm 122 with respect to the post 100 and the bobbin 128 for the following play of a record.

The basic feature common to both embodiments is that there is a rolling action of the face plates 28, 114 about their associated posts 22, 100 and a rolling action of the bobbins 36, 128 about their associated face plates 30, 124. The angular motion of the bobbins will always be transmitted in a ratio which is inversely proportional to their diameters, and hence the cartridge of each embodiment will be maintained tangential to the record groove throughout the entire playback period. Not only is the foregoing achieved without introducing any noticeable sliding friction, but the envisaged construction permits the tone arm parts to be formed of exceedingly light weight members. Furthermore, in each instance, any resistance to flexing of the wire 54 on one side of the tone arm A is constantly offset or neutralized by the wire on the other side. Similarly, the resistance to flexing of the band 152 is always offset by the band 154 as the tone arm B sweeps through its playback arc.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. A tone arm comprising post means providing a first surface constituting a segment of a first cylinder, bobbin means providing a second surface constituting a segment of a second cylinder having a radius of curvature twice that of said first cylinder, a pick-up cartridge mounted on said bobbin means for rotation therewith, a reach member between said post and bobbin means provided with oppositely facing third and fourth surfaces constituting segments of a third cylinder, belt means retaining said bobbin means and reach member in an assembled relationship with said post means so that said second surface is in contact with said third surface and said fourth surface is in contact with said first surface, whereby when said reach member is swung through a given angle said second surface will roll about said third surface and said fourth surface will roll about said first surface.

2. A tone arm in accordance with claim 1 in which said belt means includes a flexible wire embracing portions of said post and bobbin means.

3. A tone arm in accordance with claim 2 including means for maintaining said wire taut.

4. A tone arm in accordance with claim 1 in which said belt means includes a pair of flexible bands embracing portions of said post and bobbin means.

5. A tone arm in accordance with claim 4 in which said bands are provided with corrugated sections for maintaining said bands taut.

6. A tone arm comprising post means having a bearing surface constituting a segment of a cylinder and oppositely directed surfaces angularly displaced from said bearing surface constituting additional segments of a cylinder, bobbin means having a bearing surface constituting a segment of a cylinder and oppositely directed surfaces angularly displaced from said second-mentioned bearing surface constituting additional segments of a cylinder, said second-mentioned additional surfaces having twice the radius of said first-mentioned additional surfaces, a pick-up cartridge mounted on said bobbin means for rotation therewith, a reach member between said post and bobbin means provided with oppositely directed bearing surfaces constituting cylindrical segments of the same radius, and flexible belt means extending between the post and bobbin means in a laterally displaced relation with said reach member to engage the additional surfaces of said post and bobbin means and thus maintain the bearing surfaces of said post and bobbin means in a rolling relation with the bearing surfaces of said reach member.

7. A tone arm mechanism in accordance with claim 6 in which the radius of the bearing surface of the post means is the same as that of the additional surfaces of said post means, and in which the radius of the bearing surface of the bobbin means is the same as that of the additional surfaces of said bobbin means.

8. A tone arm mechanism in accordance with claim 7 in which said post means constitutes a hollow cylindrical shell.

9. A tone arm mechanism in accordance with claim 6 in which the radius of the bearing surface of the post means is different from that of the additional surfaces of said post means and in which the radius of the bearing surface of the bobbin means is different from that of the additional surfaces of said bobbin means, said second-mentioned different radius being twice as great as said first-mentioned different radius.

10. A tone arm mechanism in accordance with claim 9 in which said post and bobbin means are each arcuately notched for the accommodation of cylindrical pins to provide the respective bearing surfaces for said post and bobbin means.

11. A tone arm comprising a cylindrical post, a cylindrical bobbin having twice the radius of curvature of said post, a pick-up cartridge mounted on said bobbin for rotation therewith, a reach arm provided with a curved face plate at each end, each face plate having the same radius of curvature, a flexible wire means embracing the upper and lower ends of said post and bobbin for retaining said bobbin and reach arm in an assembled relation with said post so that said bobbin is maintained in an engaged relation with one of said face plates and the other of said face plates is maintained in engagement with said post, whereby when said reach arm is swung through a given angle said bobbin will roll about said one face plate adjacent thereto and said other face plate will roll about said post.

12. A tone arm in accordance with claim 11 including a wire take-up mechanism also embraced by said wire means for maintaining said wire means taut.

13. A tone arm in accordance with claim 12 in which said post, bobbin and face plates are formed with grooves at predetermined elevations, portions of said wire means being received in portions of said grooves.

14. A tone arm in accordance with claim 13 in which said take-up mechanism includes a pair of pulleys on either side of said reach arm, said pulleys directing said wire means from said lower end of the bobbin to said upper end thereof.

15. A tone arm comprising a post having cylindrical segments of one radius of curvature, a cylindrical pin concentrically supported by said post at a locus intermediate said segments having a smaller radius of curvature than said one radius of curvature, a bobbin having cylindrical segments of a radius of curvature twice as large as said one radius of curvature, a pick-up cartridge mounted on said bobbin for rotation therewith, a second cylindrical pin concentrically supported by said bobbin at a locus intermediate said last-mentioned segments, said second pin having a radius of curvature twice as large as said smaller radius of curvature, a reach arm provided with a curved face plate at each end, each face plate having the same radius of curvature, flexible band means embracing said post and bobbin segments for maintaining said bobbin and reach arm in an assembled relation with said post so that said second cylindrical pin is held in engagement with one of said face plates and the other of said face plates is held in engagement with said post, whereby when said reach arm is swung through a given angle said bobbin will roll about said one face plate adjacent thereto and said other face plate will roll about said post.

16. A tone arm in accordance with claim 15 in which said band means includes corrugated sections for maintaining said band means taut.

17. A tone arm in accordance with claim 15 in which said band means includes a pair of resilient metallic band members having their ends anchored to said post and bobbin, said post and bobbin being of electrical insulating material.

18. A tone arm in accordance with claim 15 including a pair of conductors leading from said cartridge, one of said conductors being electrically connected to the anchored end of one band member at said bobbin and the other of said conductors being electrically connected to the anchored end of the other band member at said bobbin.

References Cited in the file of this patent

UNITED STATES PATENTS

| | | |
|---|---|---|
| 1,933,400 | Victor | Oct. 31, 1933 |
| 1,963,673 | Patino | June 19, 1934 |

FOREIGN PATENTS

| | | |
|---|---|---|
| 1,149,133 | France | Dec. 20, 1957 |